United States Patent
Parchami et al.

(10) Patent No.: US 12,079,738 B2
(45) Date of Patent: Sep. 3, 2024

(54) VARIANCE OF GRADIENT BASED ACTIVE LEARNING FRAMEWORK FOR TRAINING PERCEPTION ALGORITHMS

(71) Applicant: Ford Global Technologies, LLC, Dearborn, MI (US)

(72) Inventors: Armin Parchami, Ann Arbor, MI (US); Ghassan AlRegib, Johns Creek, GA (US); Dogancan Temel, Atlanta, GA (US); Mohit Prabhushankar, Atlanta, GA (US); Gukyeong Kwon, Atlanta, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 878 days.

(21) Appl. No.: 17/172,854

(22) Filed: Feb. 10, 2021

(65) Prior Publication Data

US 2022/0253724 A1 Aug. 11, 2022

(51) Int. Cl.
| | |
|---|---|
| G06N 5/04 | (2023.01) |
| G06F 18/214 | (2023.01) |
| G06F 18/24 | (2023.01) |
| G06N 3/02 | (2006.01) |
| G06N 3/08 | (2023.01) |
| G06N 3/084 | (2023.01) |
| G06N 20/00 | (2019.01) |

(52) U.S. Cl.
CPC ............. *G06N 5/04* (2013.01); *G06F 18/214* (2023.01); *G06N 20/00* (2019.01); *G06F 18/24* (2023.01); *G06N 3/02* (2013.01); *G06N 3/08* (2013.01); *G06N 3/084* (2013.01)

(58) Field of Classification Search
CPC .......... G06N 5/04; G06N 20/00; G06N 20/10; G06N 20/20; G06N 3/02; G06N 3/08; G06N 3/084; G06F 18/214
See application file for complete search history.

(56) References Cited

U.S. PATENT DOCUMENTS

| | | | |
|---|---|---|---|
| 2019/0050987 A1 | 2/2019 | Hsieh et al. | |
| 2020/0349431 A1* | 11/2020 | Xie | ........................ G06N 3/006 |
| 2021/0073677 A1* | 3/2021 | Peterson | ................ G06N 20/00 |

OTHER PUBLICATIONS

Haussmann, E., et al., "Scalable Active Learning for Object Detection", ArXiv abs/2004.04699, submitted on Apr. 9, 2020, 10 pages.

(Continued)

*Primary Examiner* — Shane D Woolwine
(74) *Attorney, Agent, or Firm* — Christopher Storms; Kilpatrick Townsend & Stockton LLP (57) ABSTRACT

Neural networks and learning algorithms can use a variance of gradients to provide a heuristic understanding of the model. The variance of gradients can be used in active learning techniques to train a neural network. Techniques include receiving a dataset with a vector. The dataset can be annotated and a loss calculated. The loss value can be used to update the neural network through backpropagation. An updated dataset can be used to calculate additional losses. The loss values can be added to a pool of gradients. A variance of gradients can be calculated from the pool of gradient vectors. The variance of gradients can be used to update a neural network.

20 Claims, 6 Drawing Sheets

(56) References Cited

OTHER PUBLICATIONS

Brust, C, et al., "Active and Incremental Learning with Weak Supervision", Künstliche Intelligenz, vol. 34, submitted on Jan. 20, 2020, 19 pages, DOI: 10.1007/s13218-020-00631-4.
Brust, C., et al. "Active Learning for Deep Object Detection." ArXiv abs/1809.09875, Year 2019, 11 pages, DOI: 10.5220/0007248601810190.
Oksuz, K. et al. "Imbalance Problems in Object Detection: A Review." IEEE transactions on pattern analysis and machine intelligence, Year 2020, 34 pages, DOI: 10.1109/TPAMI.2020.2981890.
Xiaoming, L., et al., "Deep Active Learning for Surface Defect Detection", Sensors, vol. 20, Issue 6, Year 2020, 12 pages, https://doi.org/10.3390/s20061650.

\* cited by examiner

VARIANCE OF GRADIENT BASED ACTIVE LEARNING FRAMEWORK FOR TRAINING PERCEPTION ALGORITHMS

BACKGROUND

A neural network can iteratively learn through a supervised process by querying an information source, such as a user or oracle, to annotate and label data points with desired outputs. This learning process is known as active learning, and is an incremental, iterative process through which a neural network can update its model for new information.

The learning algorithm takes advantage of the oracle's input to learn and update. However, in scenarios where there are large volumes of data, annotating and labeling the unlabeled dataset becomes very time consuming and expensive. For instance, for a neural network for vision and object recognition, the quantity of data received can prove costly to annotate each unknown instance of an object.

The neural network can employ multiple methods to query input from the oracle. Uncertainty sampling, query by committee, or variance reduction are currently used methods, but in determining which datasets need annotation, the neural network can introduce implicit biases as dependent on its initial training data.

In labeling and annotating a dataset, an oracle must evaluate different activations and weights of the dataset to give the correct outputs for a given input. In improving the neural networks, the oracle must assess inputs that influence dataset weights, activations, and performance. Moreover, the effects of annotating and labeling data, which is backpropagated, can cause unexpected shifts in the neural network in unintended or unexpected directions.

There is a need in the art for an improved active learning training method.

SUMMARY

In a neural network implementing active learning to iteratively improve its accuracy, utilizing variations in gradients from a received dataset can reduce the need for an oracle to sift through unlabeled data and annotate high volumes of inputs. The training method can employ a variation in unlabeled data from the labeled dataset used to train the neural network. Finding the variation across multiple vectors of the dataset gives the neural network a heuristic approach in narrowing and identifying a smaller dataset by which an oracle can annotate or review.

In some embodiments, a system for training models using active learning is described with a sensor, one or more processors, and a system memory. The system memory can store instructions to cause the one or more processors to receive a dataset, classify an object in the dataset, calculate a plurality of loss values, generate a gradient for each of the plurality of loss values, add corresponding gradients to a gradient pool, calculate a variance of the gradient pool, and request annotation of at least a portion of the dataset based in part on the variance of the gradient pool.

In some embodiments, a method of training models using active learning is described with the steps of receiving a dataset, classifying an object in the dataset based on a machine learning model, calculating a plurality of loss values, generating a gradient for each of the plurality of loss values, adding a corresponding gradient to each loss value to a gradient pool, calculating a variance of the gradient pool, and requesting annotation of at least a portion of the dataset based in part on the variance of the gradient pool. In calculating the plurality of loss values, each of the loss values can characterize a discrepancy between the classification of the object in the dataset and one of a plurality of potential classifications of that object.

In some embodiments, a non-transitory, computer-readable medium is described with instructions that, when executed by one or more processors, cause the one or more processors to receive a dataset, classify an object in the dataset based on a machine learning model, calculate a plurality of loss values, generate a gradient for each of the plurality of loss values, add a corresponding gradient to a gradient pool, calculate a variance of the gradient pool, and request annotation of the dataset based in part on the variance of the gradient pool. In calculating the plurality of loss values, each of the loss values can characterize a discrepancy between the classification of the object in the dataset and one of a plurality of potential classifications of that object.

Implementations of the system and methods for training models using active learning can include one or any of the following. In some embodiments, the sensor can include a vision sensor. In some embodiments, the dataset can include data received by the sensor and/or visual object data. In some embodiments, classifying the object in the dataset can include generating an actual classification vector with a value for each of the plurality of potential classification of the object. In some embodiments, calculating the plurality of loss values can include generating a hypothetical classification vector, with each loss characterizing the difference between the actual classification and the hypothetical classification. In some embodiments, generating the gradient for each of the plurality of loss values includes selecting a loss value, backpropagating the loss value through the machine learning model to generate a gradient for the selected loss value, and repeating the steps until a gradient is generated for each of the loss values. In some embodiments, requesting annotation can include comparing the variance to a threshold value and requesting annotation when the variance exceeds the threshold value. In some embodiments, the portion of the dataset for which annotation is requested includes a frame of data and buffered data surrounding the frame of data.

BRIEF DESCRIPTION OF THE DRAWINGS

A further understanding of the nature and advantages of various embodiments can be realized by reference to the following figures. In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Active learning in neural networks can query an oracle for flagging unlabeled datasets to provide a more accurate model through iterative training. The unlabeled datasets can come from vision systems, for example, in object detection models. Described generally are systems and methods for training models using a determined variance of gradients to give a heuristic understanding of the model and further reduce the computational expenses and volume of data an oracle or information source needs to manually label.

As an example, the neural networks can utilize a perception pipeline for acquiring visual data. The perception pipeline can implement vision sensors and object bounding algorithms to provide a dataset through which an object detection model can then classify and detect objects within the dataset. The perception pipeline can be implemented in, for example, vehicles, for the purpose of object detection from a surrounding environment of the vehicle.

A vehicle utilizing a perception pipeline can communicatively interact with a training model to update the object detection model according to described methods and systems below. The object detection model can implement the training method to further update itself without a computationally expensive, burdensome, and high-volume amount of data to be annotated.

Figure 1:
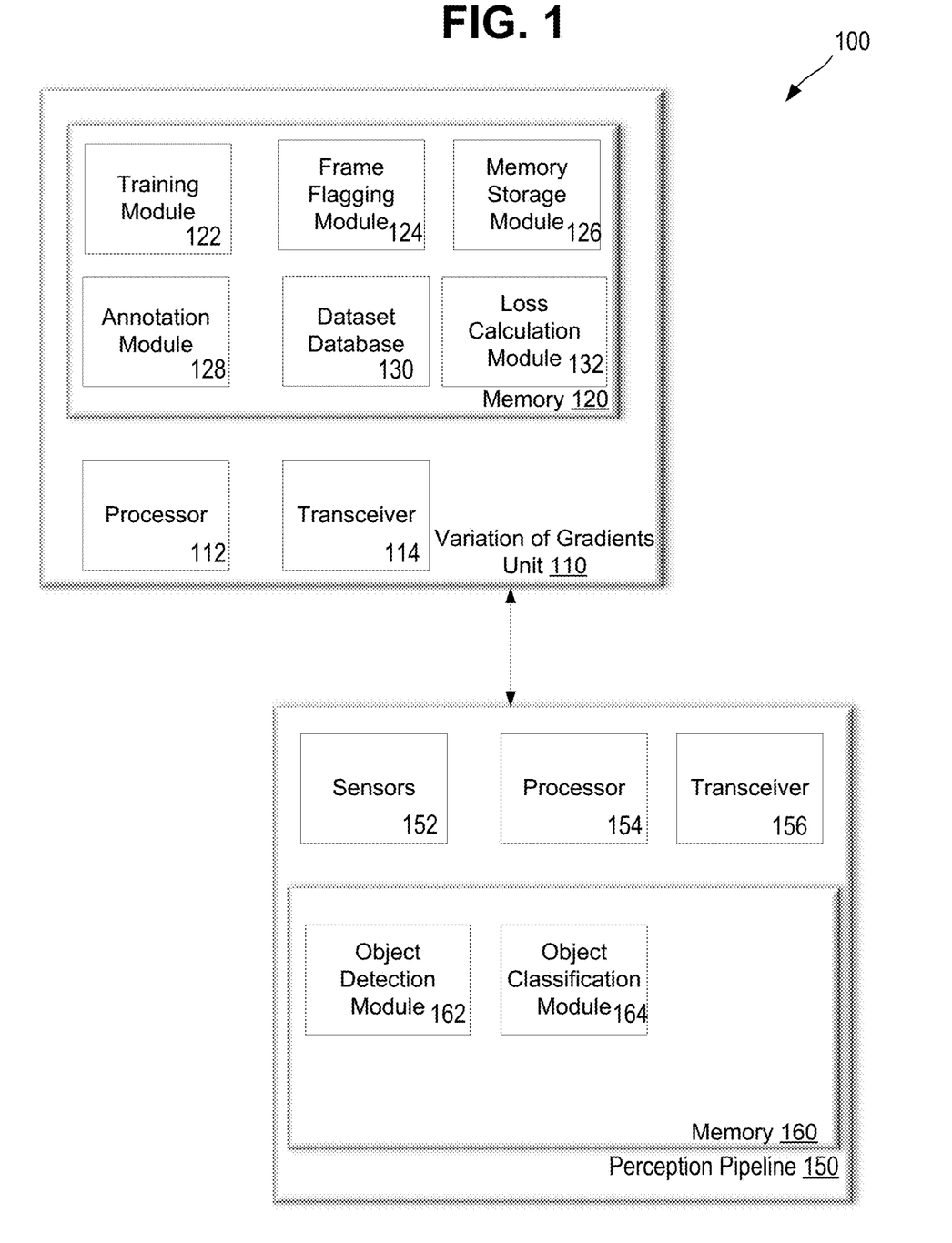
FIG. 1 is an illustration of an intelligence system for training models using active learning, according to embodiments.

FIG. 1 shows an intelligence system 100 for training a model of object recognition by active learning. The system 100 has a perception pipeline 150 and a variance of gradients unit 110. The perception pipeline 150 can be used for receiving visual data. The variance of gradients unit 110 can be used for generating a variance of different gradients from a dataset generated by the perception pipeline 150. The perception pipeline 150 can be in electronic communication with the variance of gradients unit 110.

The perception pipeline 150 has sensors 152, a processor 154, a transceiver 156 and a memory 160. In some embodiments, the perception pipeline 150 can belong to a vehicle. The processor 154 can be a computer processing unit, graphics processing unit, or any suitable processor for executing instructions or modules stored within the perception pipeline memory 160. The transceiver 156 can be a unit capable of receiving and transmitting signals. For example, the perception pipeline 150 can be in electronic communication with the variance of gradients unit 110 through the transceiver 156.

The sensors 152 can be vision sensors, pressure sensors, sonar sensors, or any suitable sensors for acquiring data. In some embodiments, the sensors 152 can be located on the outside of a vehicle.

The memory 160 can have an object detection module 162, an object classification module 164. The memory 160 can be a learning algorithm, a neural network, or a model for object recognition.

The object detection module 162 can comprise, for example, instructions stored within the memory 160, which instructions can be related to computer vision and for detecting particular objects. In some embodiments, the object detection module 162 can be suited for detecting objects within a dataset received by the sensors 152. For example, in an embodiment where the perception pipeline 160 belongs to a vehicle, the object detection module 162 can detect cats, dogs, horses, street signs, pedestrians, traffic lights, or other objects the sensors 152 can sense. In some embodiments, the object detection module 162 can detect boundaries of objects within a dataset received from the sensors 152. The object detection module 162 can communicate with the object classification module 164.

The object classification module 164 can classify objects bounded by the object detection module 162. For example, the object classification module 164 can receive a dataset from the object classification module 164 of bounded objects to be classified, and, in some embodiments, classify the bounded objects as either a cat or not a cat. In some embodiments, the object classification module 164 can classify across multiple classes, such as determinations of a cat, a dog, a horse, or a plant. In the described example, the object classification module would result in a 4-way classification (e.g., a cat classification, a dog classification, a horse classification, or a plant classification). While the object classification module 164 described here classifies animals, the object classification module 164 can be used for any suitable classification task.

The variance of gradients unit 110 can include a processor 112, a transceiver 114, and/or a memory 120. The processor 112 can be a computer processing unit, graphics processing unit, or any suitable processor for executing instructions or modules stored within the variance of gradients unit memory 120. The transceiver 114 can be a unit capable of receiving and transmitting signals. For example, the variance of gradients unit 110 can be in electronic communication with the perception pipeline 150 through the transceiver 114.

The memory 120 can include a training module 122, a frame flagging module 124, a memory storage module 126, an annotation module 128, a dataset database 130, and/or a loss calculation module 132.

The dataset database 130 can receive and store a dataset. In some embodiments, the dataset database 130 can receive a dataset of sensor data, such as from the sensors 152 from the perception pipeline 150. The dataset database 130 can store the received dataset, for example, for a later oracle to review or as an initially received dataset starting point. The dataset may have buffered data, with frames around a particular frame.

The loss calculation module 132 can calculate a loss between vectors of a dataset from the dataset database 130. For example, in some embodiments, the dataset received from the dataset database 130 is an n-dimensional vector, as a result from an n-way classification of the bounded objects. The loss can be calculated for each vector, resulting in a scalar value for each respective vector. The loss calculated can be based off of a calculated error in each respective vector as compared to a known dataset of a model. For example, the loss can be calculated using a loss function for stochastic gradient descent, mean squared error, a maximum likelihood estimation, cross-entropy, or any suitable loss function. Given a scalar value for each vector the loss is calculated for, an n-dimensional vector of loss values can be obtained. By backpropagating the loss results, a neural network or model can update its inputs and outputs to correct for any perceived errors. The n-dimensional gradient of loss values can be stored in a memory storage module, such as memory storage module 126.

The training module 122 can train a neural network or model using a training set of inputs and outputs. The inputs and outputs can be provided by an external source, such as through transceiver 114. The training module 122 can update a neural network iteratively, such as through stochastic gradient descent, or through other iterative training algorithms. The output of the training module 122 can be, in some embodiments, an updated neural network, or an updated training set.

The frame flagging module 124 can utilize an updated neural network to flag particular frames for annotation by an oracle. The frame flagging module 124 can determine frames within a dataset, such as one received from the dataset database 130, based off of the calculated loss. For example, a neural network can use the gradient of loss values to find frames that deviate further than an expected loss from the mean. The number of unannotated frames in using the frame flagging module 124 can be reduced versus merely flagging all the frames that are unannotated as can be done with a neural network not employing a comparison with the variance of gradients. In some embodiments, flagged frames can comprise frames expected to provide the greatest training benefit to the neural network or other machine learning model. Thus, by flagging and then annotating these frames, the greatest training benefit can be achieved while greatly decreasing the time and/or computing resources that would be otherwise used in annotating the data. In some embodiments, the frames that are flagged may be buffered data, comprising frames that are around the particular frame in need of annotation.

The annotation module 128 can receive the frames to be flagged from the frame flagging module 124. These frames can be queried to signal to an oracle or another information source potential frames that need additional input for a more complete or accurate model. The information source can be a user, can be another neural network, or can be cloud-stored information.

The memory storage module 126 can be in electronic communication with the loss calculation module 132. In some embodiments, the memory storage module 126 can store vectors calculated from the loss calculation module 132. For example, in some embodiments, a gradient of losses can be calculated from the loss calculation module 132, which can then be stored in the memory storage module 126. The memory storage module 126 can additionally store flagged frames from the frame flagging module 124 for later annotation. The memory storage module 126 can additionally store a copy of a received dataset, such as a dataset from the dataset database 130.

In operation, the perception pipeline 150 can acquire data through the sensors 152. The data received by the sensors 152 can be processed by the processor 154 by executing the object detection module 162 and the object classification module 164 on the received data. For example, in some embodiments where the sensors 152 are vision sensors, the object detection module 162 and the object classification module 164 can bound objects detected from the sensors 152. The bounded objects can be sent from the perception pipeline 150 to the variance of gradients unit 110 through transceiver 156.

The variance of gradient units 110 can receive data through the transceiver 114. The processor 112 can then execute the various modules stored in the memory 120. The data received can be stored in the dataset database 130. After being stored, the training module 122 can be execute operations on the received dataset, and from that, a loss calculation module 132 can determine the loss from a neural network and received data. The loss calculated can be backpropagated and used to update the training module 122 and to update a neural network. The gradients of the losses calculated can be stored in the dataset database 130. A stored variance of gradients can then be used to further update the training module and reduce the number of required annotated frames, as well as provide a more heuristic approach as to weights or activations that can be prioritized. The frame flagging module 124 can then flag problematic frames in the dataset. The annotation module 128 can be used to annotate any found problematic frames.

Figure 2:
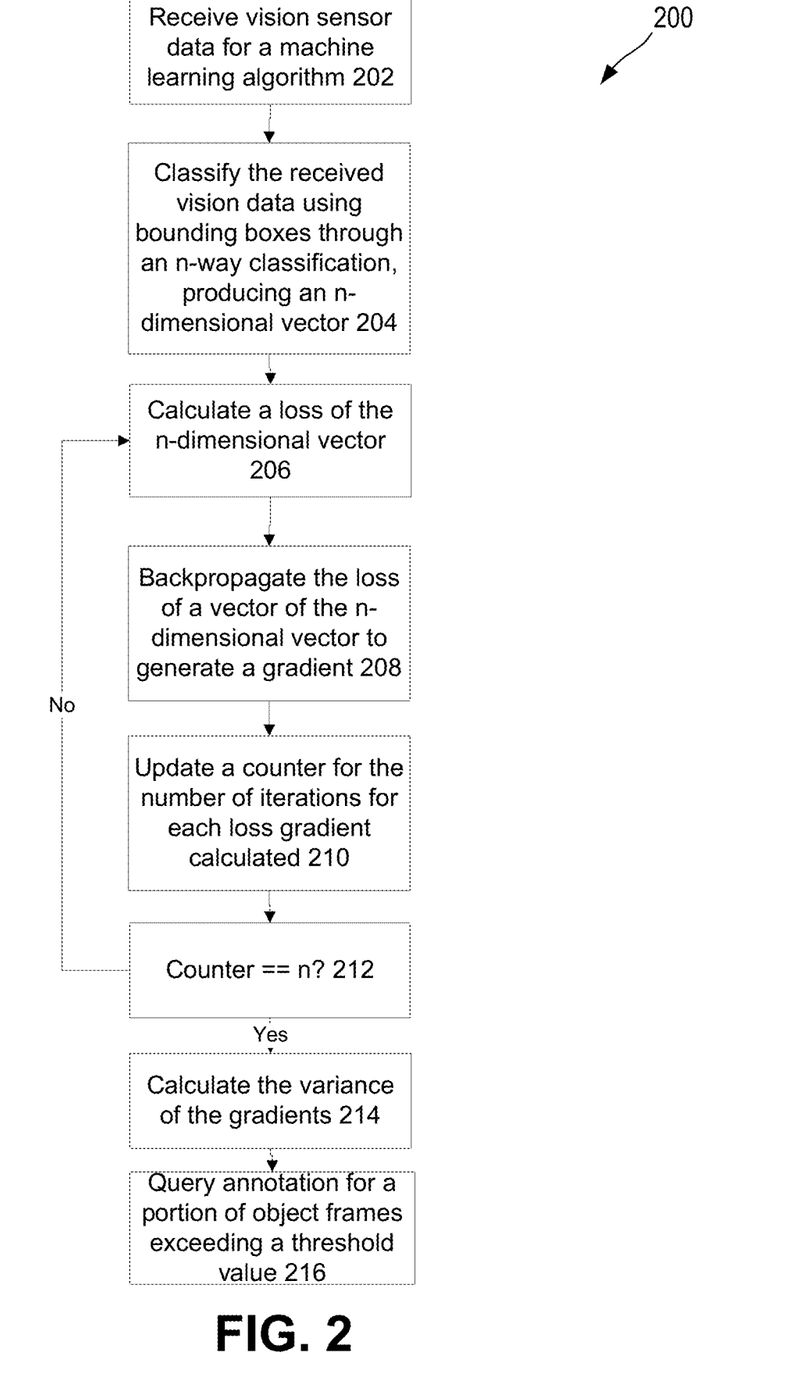
FIG. 2 is a flowchart for training models using active learning, according to embodiments.

FIG. 2 is a flowchart showing steps of one embodiment of a process 200 for training a model using active learning. The process 200 can be performed by all or portions of the intelligence system 100 including, for example, the variation of gradients unit 110, or a combination of the object detection module 162, the object classification module 164, the loss calculation module 132, the frame flagging module 124, or the annotation module 128.

In step 202, data can be received by a vision sensor, such as, for example, the sensor 152. In some embodiments, this data can, in following steps, be used as an input for a machine learning algorithm. In some embodiments, the data can come from a vision sensor acquiring data from a vehicle. The machine learning algorithm can be an algorithm for object classification or object detection.

In step 204, the vision data can be classified by a perception pipeline, such as the perception pipeline 150, using bounding boxes. The bounded items can then be classified using an n-way classification to produce an n-dimensional vector of data. In some embodiments, the classification can be performed by an object classification module, such as the object classification module 164. In some embodiments, this classification can include generating a value for each of a plurality of potential classifications of the vision data or of one or several objects in the vision data, the value characterizing the probability of the vision data or of the one or several objects in the vision data belonging to that respective classification. Thus, this classification can result in the generation of a vector, referred to herein as an actual classification vector, having n-values, each value in the n-value corresponding to the probability of the vision data or of one or several objects in the vision data belonging to one of the plurality of potential classifications.

Steps 206 through 212 form a loop whereby a loss value and gradient for each potential classification outcome for an object in a bounding box is determined. At a completion of these iterative steps, a loss value and a gradient will be calculated for each of n-potential classifications for the object. The resultant loss values can form an n-vector of loss values.

In step 206, a loss of the n-dimensional vector produced in step 204 is calculated. The loss can be calculated by a loss calculation module, such as the loss calculation module 132. In some embodiments, the n-dimensional vector can be calculated by setting a hypothetical classification vector, as described above in step 204, to represent 1 of n-number of classifications. The loss can be calculated as the difference between the actual classification vector, comprising various n-values corresponding to the probability of the vision data, and the hypothetical classification vector, comprising various n-values corresponding to a hypothetical classification of an object. In some embodiments, the hypothetical classification vector can be a set of inputs and outputs of a neural network.

In step 208, the calculated loss is backpropagated through the model. In some embodiments, this backpropagation of the loss value results in the generation of a gradient associated with the loss value. The backpropagation can be done by a loss calculation module, such as the loss calculation module 132.

In step 210, a counter for the number of iterations for each loss gradient is incremented. In some embodiments, each time a new loss value is calculated, the counter can be incremented by a value of one. The counter may be stored in, for example, a memory storage module, such as the memory storage module 126, and updated by a processor, such as the processor 112 or the processor 154.

In step 212, the counter is checked for whether the counter is equal to "n", "n" being the number of dimensions of the vector produced in step 204. A processor, such as the processor 112 or the processor 154, can check a memory storage module, such as the memory storage module 126, to verify whether the counter number "n" is equal to the dimensions of the vector produced in step 204. If the counter is not equal to n, the flowchart proceeds to step 206. If the counter is equal to n, the flowchart proceeds to step 214.

In step 214, the variance of gradients is calculated using the provided n-dimensional vector of each loss calculated. The variance of gradients can provide a heuristic approach to determine which, if any weights are overweighted, which overweighting can lead to a skewing in data used for training, and thus in the training of the neural network. In some embodiments, based on the comparison of the gradients to a threshold value, the gradients, or the decision made based on the gradients, can be sent to the cloud. The gradients can be sent by a transceiver, for example, the transceiver 114.

In step 216, the model can query annotation for a portion of objects within the classified objects, for objects that exceed a threshold value for the calculated variance of gradients. The querying can be done by a frame flagging module, such as the frame flagging module 124. An oracle can annotate any flagged frames through an annotation module, such as the annotation module 128.

Figure 3:
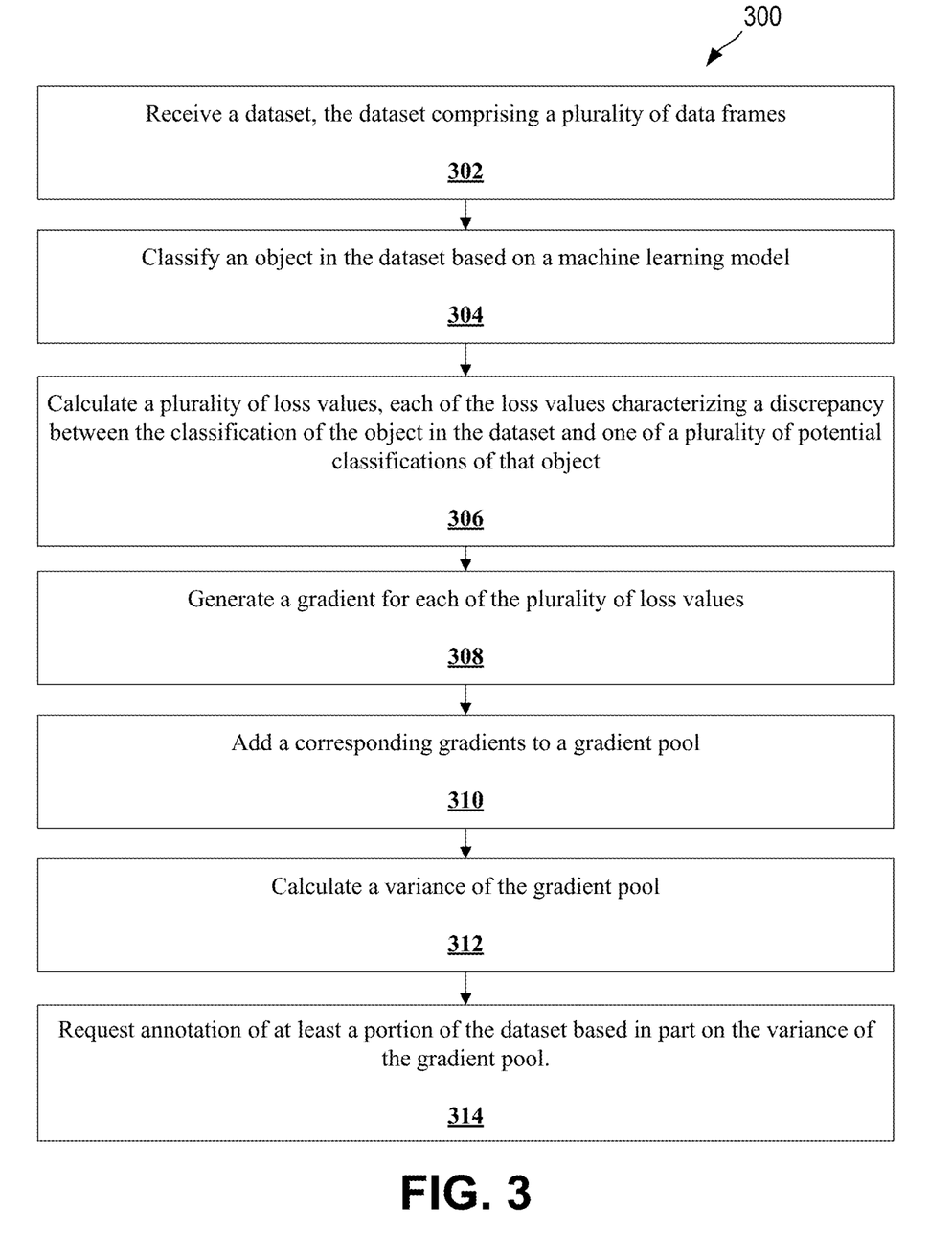
FIG. 3 is a flowchart of a method of training models using active learning, according to embodiments.

FIG. 3 is a flowchart illustrating one embodiment of a process 300 for training models using active learning, according to embodiments. The process 300 can be performed by all or portions of the intelligence system 100 including, for example, the variation of gradients unit 110, or a combination of the object detection module 162, the object classification module 164, the loss calculation module 132, the frame flagging module 124, or the annotation module 128.

In step 302, a dataset is received, the dataset comprising a plurality of data frames. The dataset can come from a perception pipeline, such as perception pipeline 150. The data frames can, in some embodiments, be images that have been bounded as detected objects to be classified. The dataset can be, for example, vision data, such as data received by the sensors 152. The dataset, in some embodiments, can be stored in, for example, a dataset database, such as the dataset database 130.

In step 304, the dataset is classified based on a machine learning model. The dataset can be classified through an object classification module, such as the object classification module 164. The classification can, according to some embodiments, be an n-way classification for a bounded object within a frame.

In step 306, a plurality of loss values is calculated, with each loss characterizing a discrepancy between the classification of the object in the dataset and one of a plurality of potential classifications of the object. The loss can be calculated by a loss calculation module, such as the loss calculation module 132. The loss can be calculated as the difference between the actual classification vector, comprising various n-values corresponding to the probability of the vision data, and the hypothetical vector, comprising various n-values corresponding to a hypothetical classification of an object. In some embodiments, the hypothetical classification can be a set of inputs and outputs of a neural network.

In step 308, a gradient for each of the plurality of loss values is generated. The gradient can be generated by a loss calculation module, such as the loss calculation module 132. In some embodiments, the gradient may be generated recursively for each of the frames for each different classification performed on the dataset.

In step 310, corresponding gradients are added to a gradient pool. The gradient pool can, for example, in some embodiments be stored in a memory storage module, such as the memory storage module 126.

In step 312, a variance in the gradient pool is calculated. The variance can be calculated based off of the generated gradients for each classification. The variance can further, in some embodiments, be measured as the difference between the generated gradient and a hypothetical gradient of classification values. In some embodiments, the variance can be calculated through a loss calculation module, such as the loss calculation module 132.

In step 314, annotation may be requested for at least a portion of the dataset based in part on the variance of the gradient pool by, in some embodiments, a frame flagging module, such as the frame flagging module 124. When the variance of gradients exceeds a particular threshold, the machine learning algorithm may request an oracle to annotate and label the respective frame with the variance of gradients exceeding the threshold value. The annotation may be through an annotation module, such as the annotation module 128.

Figure 4:
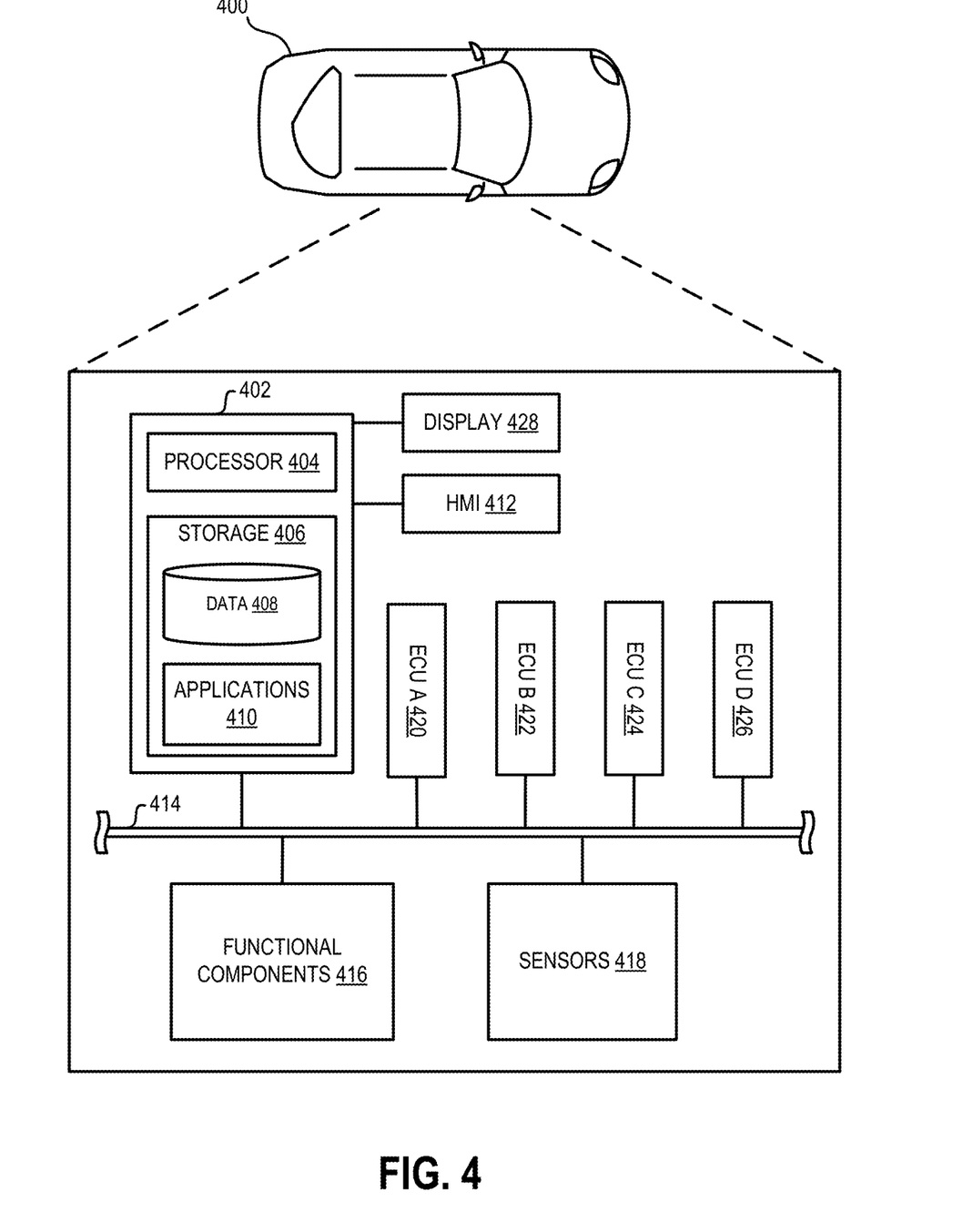
FIG. 4 illustrates a block diagram of a vehicle system, according to embodiments.
Figure 5:
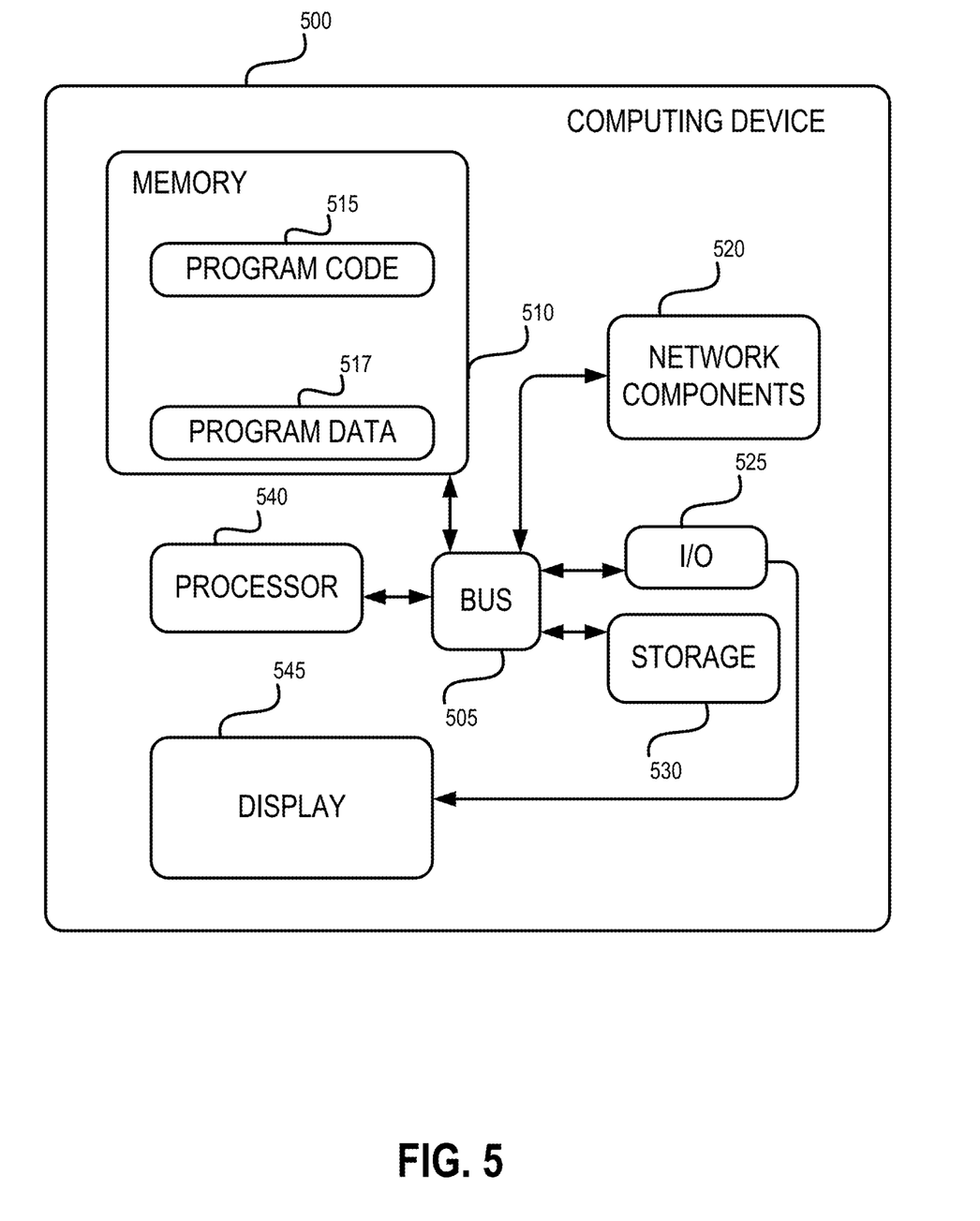
FIG. 5 illustrates a block diagram of a computing system, according to embodiments.

Any suitable computing system or group of computing systems can be used for performing the operations or methods described herein. For example, FIG. 4 illustrates a vehicle system including a computing system 402 as well as multiple ECUs which can perform some or all of the functions described herein. FIG. 5 further depicts an example of a computing device 500 that can be at least a portion of computing system 402.

FIG. 4 illustrates a block diagram of a vehicle system 400, according to some embodiments. The vehicle system 400 can include a computing system 402 configured to communicate over an in-vehicle network 414. The computing system 402 includes a processor 404 and storage 406. While a vehicle system 400 is shown in FIG. 4, the example components as illustrated are not intended to be limiting. Indeed, the vehicle system 400 can have more or fewer components, and additional or alternative components and/or implementations can be used. It should be noted that the use of a vehicle system 400 environment is illustrative, as the components and/or functionality can be utilized in other types of systems such as flight control system in an airplane, or a medical device or industrial machine.

The vehicle system 400 can include various types of automobile, crossover utility vehicle (CUV), sport utility vehicle (SUV), truck, recreational vehicle (RV), boat, plane or other mobile machine for transporting people or goods. In many cases, the vehicle system 400 can be powered by an internal combustion engine. As another possibility, the vehicle system 400 can be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 400 can vary, the capabilities of the vehicle system can correspondingly vary. As some other possibilities, vehicle system 400 can have different capabilities with respect to passenger capacity, towing ability and capacity, and storage volume.

The computing system 402 can include a Human Machine Interface (HMI) 412 and a display 428 for user interaction with the computing system 402. An example computing system 402 can be the SYNC™ system provided by FORD MOTOR COMPANY™ of Dearborn, Michigan. In some examples the display 428 can include a vehicle infotainment system including one or more displays. The HMI 412 can be configured to support voice command and BLUETOOTH™ interfaces with the driver and driver carry-on devices, receive user input via various buttons or other controls, and provide vehicle status information to a driver or other vehicle system 400 occupants. For instance, the computing system 402 can interface with one or more buttons or other HMI 412 configured to invoke functions on the computing system 402 (e.g., steering wheel audio buttons, a push-to-talk button, instrument panel controls, etc.). The computing system 402 can also drive or otherwise communicate with the display 428 configured to provide visual output to vehicle occupants, e.g., by way of a video controller. In some cases, the display 428 can be a touch screen further configured to receive user touch input via the video controller, while in other cases the display 428 can be a display only, without touch input capabilities. In an example, the display 428 can be a head unit display included in a center console area of the vehicle system 400. In another example, the display 428 can be a screen of a gauge cluster of the vehicle system 400.

The computing system 402 can further include various types of computing apparatus in support of performance of the functions of the computing system 402 described herein. In an example, the computing system 402 can include one or more processors 404 configured to execute computer instructions, and a storage 406 medium on which computer-executable instructions and/or data can be maintained. A computer-readable medium (also referred to as a processor-readable medium or storage 406) includes any non-transitory (e.g., tangible) medium that participates in providing data (e.g., instructions) that can be read by a computer (e.g., by the one or more processors 404). In general, the processor 404 receives instructions and/or data, e.g., from the storage 406, etc., to a memory and executes the instructions using the data, thereby performing one or more processes, including one or more of the processes described herein. Computer-executable instructions can be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 406 can include divisions for data 408 and applications 410. The data 408 can store information such as databases and other such information. The applications 410 can store the computer-executable instructions or other such instructions executable by the processor 404.

The computing system 402 can be configured to communicate with mobile devices of the vehicle system 400 occupants. The mobile devices can be any of various types of portable computing device, such as cellular phones, tablet computers, smart watches, laptop computers, portable music players, or other devices capable of communication with the computing system 402. As with the computing system 402, the mobile device can include one or more processors configured to execute computer instructions, and a storage medium on which the computer-executable instructions and/ or data can be maintained. In some examples, the computing system 402 can include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 402 can communicate with the mobile device over a wired connection, such as via a USB connection between the mobile device and a Universal Serial Bus (USB) subsystem of the computing system 402.

The computing system 402 can be further configured to communicate with other components of the vehicle system 400 via one or more in-vehicle networks 414. The in-vehicle networks 414 can include one or more of a vehicle controller area network (CAN), an Ethernet network, or a media oriented system transfer (MOST), as some examples. The in-vehicle networks 414 can allow the computing system 402 to communicate with other units of the vehicle system 400, such as ECU A 420, ECU B 422, ECU C 424, and ECU D 426. The ECUs 420, 422, 424, and 426 can include various electrical or electromechanical systems of the vehicle system 400 or control various subsystems of the vehicle system 400. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 400); a radio transceiver module configured to communicate with key fobs or other vehicle system 400 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which can not be present in some configurations), a global positioning system (GPS) module configured to provide vehicle system 400 location and heading information, and various other vehicle ECUs configured to corporate with the computing system 402. The subsystems controlled by the various ECUs can include functional components 416 of the vehicle system 400 including elements such as the powertrain, engine, brakes, lights, steering components, and the like. Additionally, some or all of the functional components 416 can include sensors 418 as well as additional sensors equipped to the vehicle system 400 for detecting various states, positions, proximity, temperature, and the like of the vehicle system 400 and subsystems thereof. The ECUs 420, 422, 424, 426 can communicate with the computing system 402 as well as the functional components 416 and the sensors 418 over the in-vehicle network 414. While only four ECUs are depicted in FIG. 4, any number (more or fewer) of ECUs can be included in vehicle system 400.

FIG. 5 illustrates a block diagram of an example of a computing device 500. Computing device 500 can be any of the described computers herein including, for example, computing system 402 within the vehicle system 400 of FIG. 4 as well as ECUs 420, 422, 424, 426. The computing device 500 can be or include, for example, an integrated computer, a laptop computer, desktop computer, tablet, server, or other electronic device.

The computing device 500 can include a processor 540 interfaced with other hardware via a bus 505. A memory 510, which can include any suitable tangible (and non-transitory) computer readable medium, such as RAM, ROM, EEPROM, or the like, can embody program components (e.g., program code 515) that configure operation of the computing device 500. Memory 510 can store the program code 515, program data 517, or both. In some examples, the computing device 500 can include input/output ("I/O") interface components 525 (e.g., for interfacing with a display 545, keyboard, mouse, and the like) and additional storage 530.

The computing device 500 executes program code 515 that configures the processor 540 to perform one or more of the operations described herein. Examples of the program code 515 include, in various embodiments logic flowchart described with respect to FIG. 1 above. The program code 515 can be resident in the memory 510 or any suitable computer-readable medium and can be executed by the processor 540 or any other suitable processor.

The computing device 500 can generate or receive program data 517 by virtue of executing the program code 515. For example, sensor data, trip counter, authenticated messages, trip flags, and other data described herein are all examples of program data 517 that can be used by the computing device 500 during execution of the program code 515.

The computing device 500 can include network components 520. Network components 520 can represent one or more of any components that facilitate a network connection. In some examples, the network components 520 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 520 can be wired and can include interfaces such as Ethernet, USB, or IEEE 1394.

Although FIG. 5 depicts a computing device 500 with a processor 540, the system can include any number of computing devices 500 and any number of processor 540. For example, multiple computing devices 500 or multiple processor 540 can be distributed over a wired or wireless network (e.g., a Wide Area Network, Local Area Network, or the Internet). The multiple computing devices 500 or multiple processor 540 can perform any of the steps of the present disclosure individually or in coordination with one another.

Figure 6:
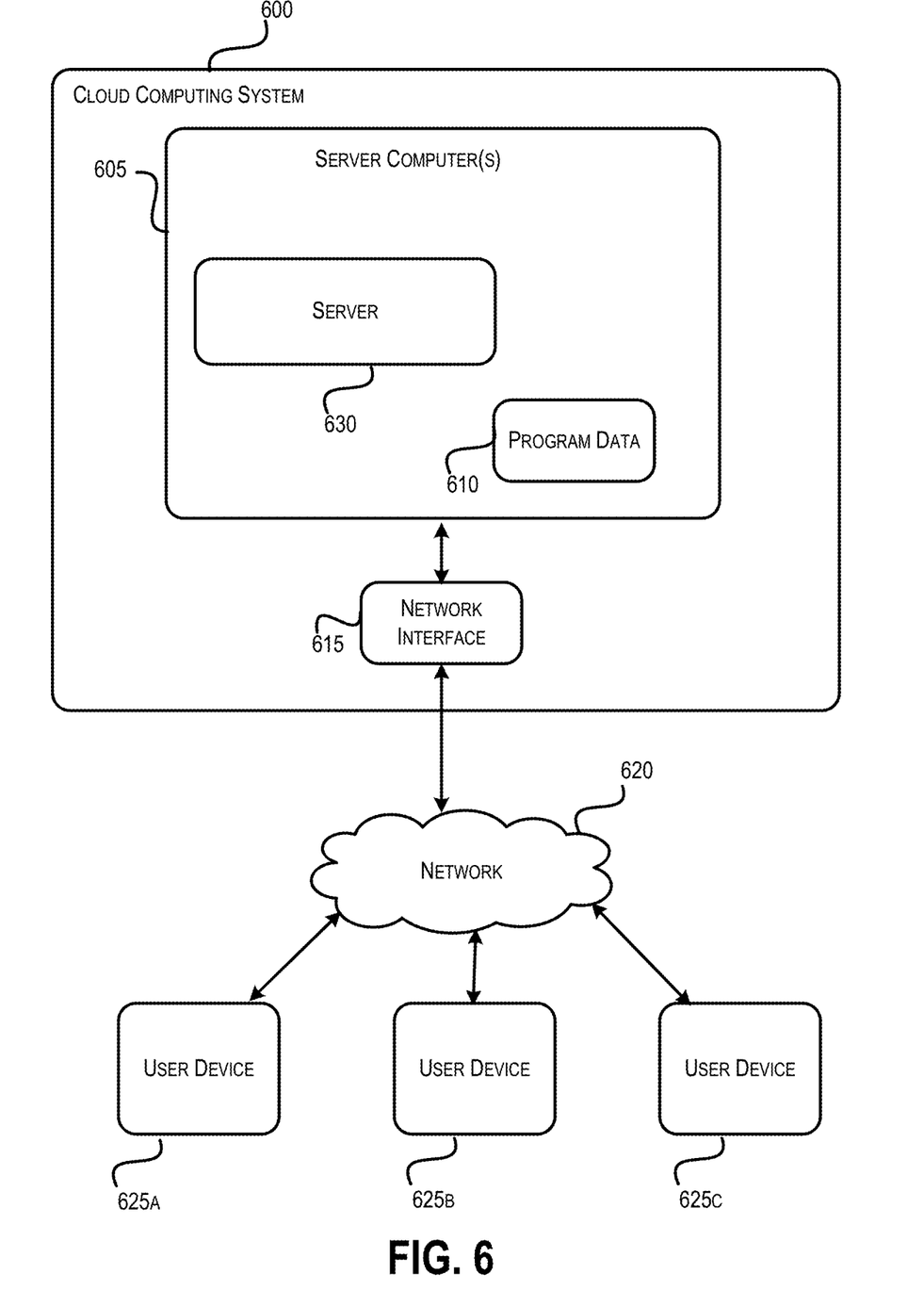
FIG. 6 illustrates a cloud computing system, according to embodiments.

In some embodiments, the functionality provided by the computing device 600 can be offered as cloud services by a cloud service provider. For example, FIG. 6 depicts an example of a cloud computing system 600 offering an intelligence service that can be used by a number of user subscribers using user devices 625a, 625b, and 625c across a data network 620. User devices 625a, 625b, and 625c could be examples of a vehicle system 400 described above. In the example, the intelligence service can be offered under a Software as a Service (SaaS) model. One or more users can subscribe to the intelligence service, and the cloud computing system performs the processing to provide the intelligence service to subscribers. The cloud computing system can include one or more remote server computers 605.

The remote server computers 605 include any suitable non-transitory computer-readable medium for storing program code (e.g., server 630) and program data 610, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions can include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 605 can include volatile memory, non-volatile memory, or a combination thereof.

One or more of the server computers 605 execute the program data 610 that configures one or more processors of the server computers 605 to perform one or more of the operations that determine locations for interactive elements and operate the adaptive rule-based system. As depicted in the embodiment in FIG. 6, the one or more server computers 605 provide the services to perform the adaptive rule-based system via the server 630. Any other suitable systems or subsystems that perform one or more operations described herein (e.g., one or more development systems for configuring an interactive user interface) can also be implemented by the cloud computing system 600.

In certain embodiments, the cloud computing system 600 can implement the services by executing program code and/or using program data 610, which can be resident in a memory device of the server computers 605 or any suitable computer-readable medium and can be executed by the processors of the server computers 605 or any other suitable processor.

In some embodiments, the program data 610 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 620.

The cloud computing system 600 also includes a network interface device 615 that enable communications to and from cloud computing system 600. In certain embodiments, the network interface device 615 includes any device or group of devices suitable for establishing a wired or wireless data connection to the data networks 620. Non-limiting examples of the network interface device 615 include an Ethernet network adapter, a modem, and/or the like. The server 630 is able to communicate with the user devices 625a, 625b, and 625c via the data network 620 using the network interface device 615.

While the present subject matter has been described in detail with respect to specific aspects thereof, it will be appreciated that those skilled in the art, upon attaining an understanding of the foregoing, can readily produce alterations to, variations of, and equivalents to such aspects. Numerous specific details are set forth herein to provide a thorough understanding of the claimed subject matter. However, those skilled in the art will understand that the claimed subject matter can be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values can, in practice, be based on additional conditions or values beyond those recited. Headings, lists, and numbering included herein are for ease of explanation only and are not meant to be limiting.

Aspects of the methods disclosed herein can be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages can be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A system for training models using active learning, the system comprising:
    a sensor;
    one or more processors;
    a system memory, the system memory storing instructions to cause the one or more processors to:
        receive a dataset, the dataset comprising a plurality of data frames;
        classify an object in the dataset based on a machine learning model;
        calculate a plurality of loss values, each of the loss values characterizing a discrepancy between the classification of the object in the dataset and one of a plurality of potential classifications of that object;
        generate a gradient for each of the plurality of loss values;
        add corresponding gradients to a gradient pool;
        calculate a variance of the gradient pool; and
        request annotation of at least a portion of the dataset based in part on the variance of the gradient pool.

2. The system of claim 1, wherein the sensor comprises a vision sensor.

3. The system of claim 1, wherein the dataset comprises data received by the sensor and/or visual object data.

4. The system of claim 1, wherein classifying the object in the dataset based on the machine learning model comprises generating an actual classification vector comprising a value for each of the plurality of potential classification of the object.

5. The system of claim 4, wherein calculating the plurality of loss values comprises: generating, for each of the plurality of potential classifications of the object, a hypothetical classification vector, and wherein each of the loss values characterizes difference between the actual classification vector and one of the hypothetical classification vectors.

6. The system of claim 1, wherein generating the gradient for each of the plurality of loss values comprises:
    (a) selecting a loss value;
    (b) backpropagating the loss value through the machine learning model to generate a gradient for the selected loss value; and
    (c) performing steps (a) and (b) until a gradient is generated for each of the loss values.

7. The system of claim 1, wherein requesting annotation of at least the portion of the dataset based in part on the variance of the gradient pool comprises comparing the variance to a threshold value and requesting annotation when the variance exceeds the threshold value.

8. The system of claim 7, wherein the portion of the dataset for which annotation is requested comprises a frame of data and buffered data surrounding the frame of data.

9. A method for training models using active learning, the method comprising:
    receiving a dataset, the dataset comprising a plurality of data frames;
    classifying an object in the dataset based on a machine learning model;
    calculating a plurality of loss values, each of the loss values characterizing a discrepancy between the classification of the object in the dataset and one of a plurality of potential classifications of that object;
    generating a gradient for each of the plurality of loss values;
    adding corresponding gradients for each of the plurality of loss values to a gradient pool;
    calculating a variance of the gradient pool; and
    requesting annotation of at least a portion of the dataset based in part on the variance of the gradient pool.

10. The method of claim 9, wherein the dataset is received from a sensor.

11. The method of claim 10, wherein the sensor comprises a vision sensor.

12. The method of claim 9, wherein classifying the object in the dataset based on the machine learning model comprises generating an actual classification vector comprising a value for each of the plurality of potential classifications of the object.

13. The method of claim 12, wherein the calculating the plurality of loss values comprises: generating, for each of the plurality of potential classifications of the object, a hypothetical classification vector, and wherein each of the loss values characterizes difference between the actual classification vector and one of the hypothetical classification vectors.

14. The method of claim 9, wherein the dataset comprises visual object data.

15. The method of claim 9, wherein generating the gradient for each of the plurality of loss values comprises:
    (a) selecting a loss value;

(b) backpropagating the loss value through the machine learning model to generate a gradient for the selected loss value; and, (c) performing steps (a) and (b) until a gradient is generated for each of the loss values.

16. The method of claim 9, wherein requesting annotation of at least the portion of the dataset based in part on the variance of the gradient pool comprises comparing the variance to a threshold value and requesting annotation when the variance exceeds the threshold value.

17. The method of claim 16, wherein the portion of the dataset for which annotation is requested comprises a frame of data and buffered data surrounding the frame of data.

18. A non-transitory, computer-readable medium comprising instructions that, when executed by one or more processors, cause the one or more processors to:

receive a dataset, the dataset comprising a plurality of data frames;

classify an object in the dataset based on a machine learning model;

calculate a plurality of loss values, each of the loss values characterizing a discrepancy between the classification of the object in the dataset and one of a plurality of potential classifications of that object;

generate a gradient for each of the plurality of loss values;

add a corresponding gradient to a gradient pool;

calculate a variance of the gradient pool; and request annotation of at least a portion of the dataset based in part on the variance of the gradient pool.

19. The non-transitory, computer-readable medium of claim 18 wherein the instructions to generate the gradient of each of the plurality of loss values comprises:

(a) selecting a loss value;

(b) backpropagating the loss value through the machine learning model to generate a gradient for the selected loss value; and (c) performing steps (a) and (b) until a gradient is generated for each of the loss values.

20. The non-transitory, computer-readable medium of claim 18, wherein the dataset is received from a sensor.

* * * * *